May 13, 1952  W. E. KAUTENBERG  2,596,564
EXPANDING FISHHOOK
Filed May 1, 1946
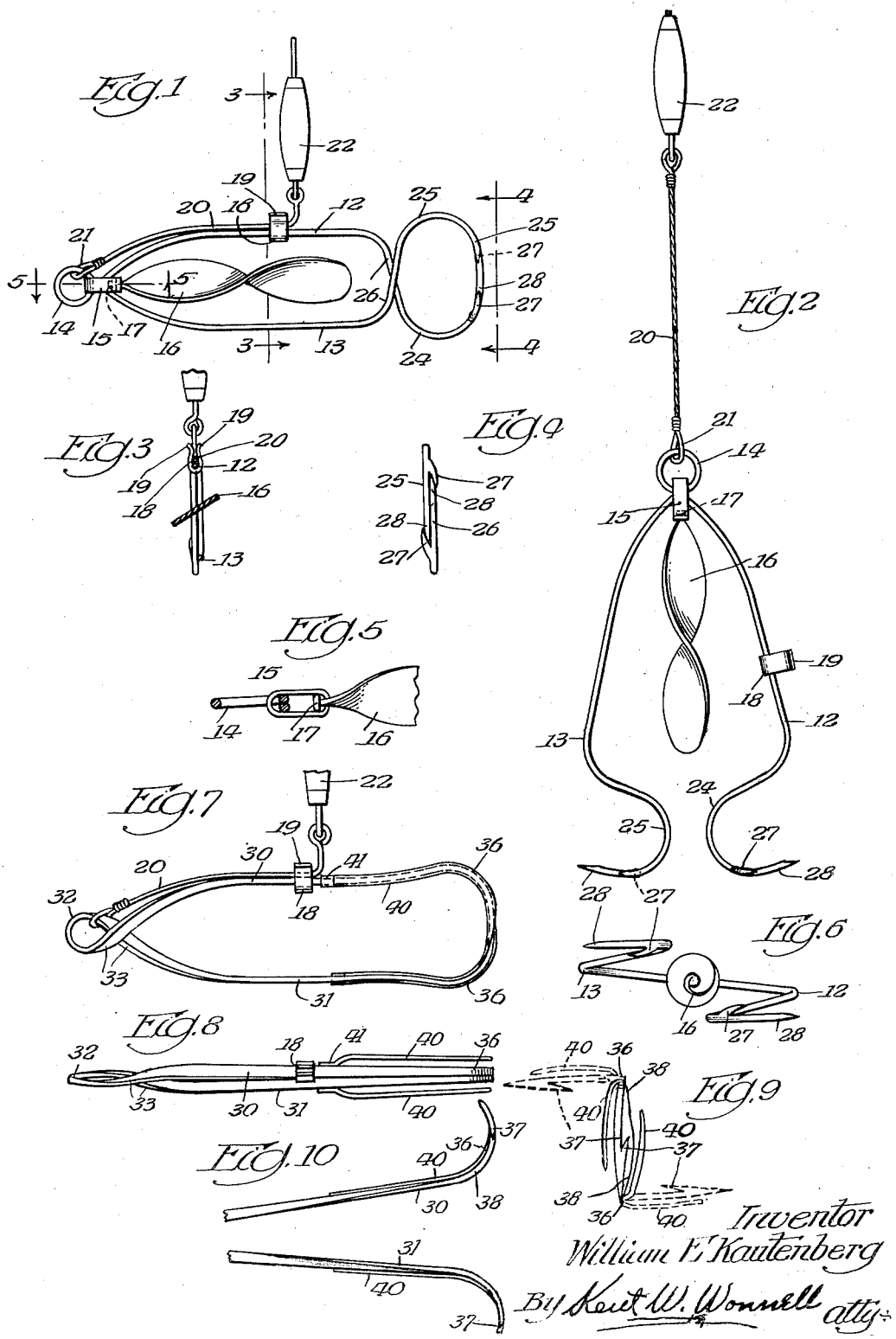
Inventor
William E. Kautenberg
By Kent W. Wonnell atty Patented May 13, 1952

2,596,564

UNITED STATES PATENT OFFICE 2,596,564

EXPANDING FISHHOOK

William E. Kautenberg, Freeport, Ill.

Application May 1, 1946, Serial No. 666,317

4 Claims. (Cl. 43—36)

This invention relates in general to a double fishhook of the expanding type in which the barbed ends of the hooks are engaged to provide a generally weedless type of hook.

An important object of the invention is to provide a pair of cooperating hooks having barbs on their inner and adjacent sides adapted to interengage and hold them together.

A further object of the invention is to provide a double hook made of spring wire and having interengageable barbs to hold them together but tending to spring apart laterally and at right angles thereto when grabbed or struck by a fish.

Still a further object of the invention is to provide an expanding hook structure adapted to be supported in relatively horizontal position for normal engagement by a fish in horizontal position in the water.

Another object of the invention is to provide a hook structure normally supported in horizontal position and movable to pendant or depending position when grabbed or struck by a fish.

A further object of the invention is to provide a double hook having spring shanks and adjacent oppositely extending hook portions which tend to spring apart when disengaged with a bait or lure disposed inwardly of the shanks.

A further object of the invention is to provide an expanding fishhook structure in which the hooks extend oppositely and have interengaging lateral barbs at or near the ends of the hook portions and tend to spring apart when grabbed or struck by a fish, the spring tension preventing the fish from disengaging itself from the hook by pulling or shaking it loose in the usual way.

Still a further object of the invention is to provide a double engaging and expanding hook structure which has substantially parallel bait holding means spaced from the engaging hooks to prevent them from becoming obstructed by the bait applied thereto.

Other and further objects of the invention will appear in the specification and will be apparent from the drawings, in which Fig. 1 is an elevational view of an expanding double fishhook in accordance with the principles of this invention, supported in horizontal position with the two hooks in interengaged relation;

Fig. 2 is an end view of the structure shown in Fig. 1 in suspended or vertical position and showing the hooks in an expanded or spread apart condition;

Fig. 3 is a sectional view taken on the line 3—3 of Fig. 1;

Fig. 4 is an end view of the structure as taken on the line 4—4 of Fig. 1;

Fig. 5 is a sectional detail view taken on the line 5—5 of Fig. 1;

Fig. 6 is an end view of the expanded structure shown in Fig. 2;

Fig. 7 is a plan view of a modified form of double expanding fishhook in which the barbs are interengaged at the sides of the hooks but spring and swing apart when released, with bait holding parts at the sides of the hooks;

Fig. 8 is a side view of the structure shown in Fig. 7;

Fig. 9 is an end view of the structure of Fig. 7 with the hooks in interengaged position; and Fig. 10 is a side view of the modified structure in a released and outwardly rotated position.

In this type of double expanding fishhooks, the hook portions are at the ends of spring shanks and the barbs instead of being on the ends inside of the hooks are disposed laterally or at the edges of the hooks in opposite relation to each other so that when the two shanks are compressed and pressed inwardly together, the barbs of the hooks may be interengaged, thus forming a structure which is practically weedless. This structure is also very effective in catching fish, for it is only disengaged when a fish of sufficient size grabs or strikes over the ends of the opposite hooks in an attempt to grab or swallow the bait, whereupon the barbs are disengaged and spring outwardly to catch the jaws or in the mouth of the fish. The points of the hooks are protected until disengaged by the bite of the fish, and then the hooks spring apart, catching the fish before he can evade the hooks.

Referring now more particularly to the drawings, a double expanding hook structure in accordance with this invention is shown in Figs. 1 to 6, having opposite shanks 12 and 13 connected at one end by a loop 14, the loop being formed by crossing the shanks adjacent to this end and providing a support for a ring 15 in which a spinner 16 is supported between the shanks 12 and 13 by means of a swivel 17.

Attached to one of the shanks 12 intermediate the ends by soldering or spot welding it thereto is a spring clip 18 for receiving a fish line 20 between opposite spring fingers 19 of the clip 18 in such a manner that the fish line may be inserted between the spring fingers but with a sharp jerk or pull, the fish line will be pulled outwardly between the fingers and disengaged from the clip.

One end of the fish line is formed with a loop 21 which is attached to the looped end 14 of the shank, and the other end of the line is usually attached to a weight or sinker 22.

The ends of the shanks 12 and 13 terminate in opposite rounded hook portions 24 and 25 with adjacent crossing portions 26 between the shanks and the ends of the hooks. Near the end of each hook and at the relatively lateral or inner side thereof is a barb 27, the point of which extends toward the pointed extremity 28 thereof, each barb forming a seat for the extremity 28 of the adjacent hook when these hook portions are pressed together against their normal separating spring pressure and being held together as shown more clearly in Figs. 1 and 4. In this position, the point or extremity of the hook is protected so that it becomes weedless when in closed position.

The barbs and hooks are resilient and are so crossed and disposed with respect to each other that they tend to spring apart laterally as represented in Fig. 6 and longitudinally or at right angles thereto as represented more clearly in Fig. 2 when the barbs and points are disengaged. In actual use, the ends of the hooks are pressed together by crossing and engaging the shanks until the points 28 of the opposite hooks are seated within the barbs 27 of the other hooks, the spring tension keeping them in this position until they are disengaged or snapped apart. They may be disengaged by slight pressure on the shank portions 12 and 13 of the hooks which may be effected either by finger pressure or by the biting of a fish against these portions in snapping at the bait.

When a fish grabs or strikes at the bait, the jaws of the fish engage the shank portions 12 and 13, bringing the hooks together enough so that the extremities 28 are freed from their engagement with the barbs 27, the hooks spread apart laterally and at right angles thereto, thereby engaging and hooking both the upper and lower jaws of the fish, keeping the tension on the hook portions so that the fish cannot loosen itself.

By suspending a hook of this kind in horizontal position as shown in Fig. 1, with the fish line extending from the loop 14 through the clip 18 and thence upwardly, one hook overlying the other, the hook ends are in natural position for engagement by fish swimming normally or horizontally in the water. If desired, the line 20 may be attached to the loop end 14 without engaging the spring clip 18, but if the hook assembly is supported in horizontal position as shown in Fig. 1, and then there is a strike or pull by a fish engaging the hook ends, the fish line 20 will be disengaged from the clip 18 thereby suspending the hook assembly in vertical position as represented in Fig. 2.

In the form of the invention shown by Figs. 7 to 10, a somewhat similar double expanding hook structure comprises shanks 30 and 31 joined by a loop 32 at one end and the shanks may have flattened portions 33 at the loop crossing, tending to spread the hook extremities of the shank resiliently apart and to swing them outwardly from engagement with each other.

At the end of each shank 30 and 31 is a rounded hook portion 36 having a barb 37 extending away from a free extremity 38 of the hook, the barbs being located at the adjacent sides of the hook portions when they are turned together so that when the hook portions are compressed and turned inwardly, the barbs may be interengaged as shown more clearly in Fig. 9, the extremities 38 extending somewhat beyond the barbs and engaging the opposite hook projections and tending to keep the hook extremities in alignment.

When these hook extremities are released by pressure on the outer rounded portions 36 of the hooks, the barbs tend to spring apart oppositely and to swing at right angles as shown in the dotted outline in Fig. 9 and as represented in Fig. 10, so that a fish may be engaged by either one or both of the barbs of the double hook in a natural hooked engagement of the fish and if the fish is sufficiently large, or the hooks are relatively small, both hook extremities may be within the mouth of the fish for engagement therewith.

In order to prevent the barbed hook extremities from being obstructed by bait applied thereto, each shank and hook extremity may be provided with a separate bait holder 40 attached at one end 41 by soldering or spot welding it thereto, the bait holder following the contour of the hook extremity of the shank and being spaced therefrom so that it is specially parallel therewith to receive bait thereon without contact with the barb side of the hook. This bait structure may be omitted, if desired, and mounted on a spinner, fly, or other fish lures may be supported by or between the shanks of the hook. This hook assembly may also be supported horizontally and vertically as represented in Figs. 1 and 2.

These expanding double hook structures may therefore be provided in different sizes for large fish which tend to swallow the bait and the hook, and a relatively smaller size may be utilized for smaller fish. Both of the hook structures are similar in action, in their method of interengagement by lateral barbs, and both of them tend to spring apart laterally and at right angles thereto when released.

Any desired type of fish lure may be attached between the shanks of the hooks and on the shanks so that they are adapted for still fishing, trolling, and also for fly or bait casing. In all uses, the hook structure when the barbs are engaged, is practically weedless so that this hook is adapted to be used in places where open hooks are impractical.

While these preferred forms of this double expanding hook are shown and described in detail, they should be regarded by way of example and not as a limitation of the invention, as various other constructions, combinations, and arrangements of the several parts may be made without departing from the spirit and scope of the invention.

I claim:

1. A fishhook assembly normally supported in horizontal position having a pair of spring shanks with hook extremities and a supporting loop at the end opposite the hooks and a spring fastening clip at one side of the shank and rigid therewith intermediate the ends, and a supporting cord attached to the loop and extending releasably through the clip and disengaged therefrom by a pull on the hook to move the hooks to vertical position.

2. A fishhook assembly adapted to be normally supported in horizontal position comprising a pair of spring shanks connected together at the ends and having hook extremities tending to spring apart, means at adjacent sides of the hooks interengageable to hold the extremities releasably together, a supporting line attached to the connected ends, and a spring fastening clip rigidly attached to one of the shanks intermediate the ends for releasably engaging the supporting line as it extends from the connected ends.

3. A fishhook comprising spring shanks with oppositely turned hook extremities which tend to spring apart laterally and at right angles thereto, reversely turned means at the ends of the extremities adapted to interengage, a fish lure supported by the shanks, and means for suspending the hook in horizontal and vertical positions comprising a line attached to the shanks at the end opposite the hooks and a line engaging and releasing clip intermediate the ends of and rigid with one of the shanks through which the line extends for supporting the hook in horizontal position, the shanks being drawn from horizontal to vertical position when the line is disengaged by a pull from the releasing clip.

4. A fishhook comprising a trap hook structure having a pair of supporting shanks, and means including a line connecting the ends of the shanks and having a clip rigid with and intermediate the ends of one of the shanks for supporting the trap hooks releasably in horizontal position and disengageable from the clip for supporting them in vertical position.

WILLIAM E. KAUTENBERG.

REFERENCES CITED

The following references are of record in the file of this patent:

UNITED STATES PATENTS

| Number | Name | Date |
| --- | --- | --- |
| 321,796 | Clark | July 7, 1885 |
| 373,991 | Lockhead | Nov. 29, 1887 |
| 454,581 | Mack | June 23, 1891 |
| 618,764 | Anderson | Jan. 31, 1899 |
| 620,896 | Edgar | Mar. 14, 1899 |
| 644,489 | Anderson | Feb. 27, 1900 |
| 720,392 | Amsden | Feb. 10, 1903 |
| 886,794 | Gilmore | May 5, 1908 |
| 1,898,442 | Grutsch | Feb. 21, 1933 |
| 1,957,799 | Peterson | May 8, 1934 |
| 2,004,316 | Foote | June 11, 1935 |
| 2,094,267 | Faria | Sept. 28, 1937 |
| 2,189,958 | Middlemiss | Feb. 13, 1940 |
| 2,274,131 | Edberg | Feb. 24, 1942 |
| 2,275,869 | Seaton | Mar. 10, 1942 |

FOREIGN PATENTS

| Number | Country | Date |
| --- | --- | --- |
| 481,456 | France | Dec. 8, 1916 |